June 22, 1926.

H. J. GRIGOLEIT

PRESSURE CONTROL SYSTEM

Filed Sept. 14, 1923

Inventor:
Henry J Grigoleit.
By Curtis B. Camp
Attorney.

Patented June 22, 1926.

1,589,384

UNITED STATES PATENT OFFICE.

HENRY J. GRIGOLEIT, OF CHICAGO, ILLINOIS, ASSIGNOR TO H. J. GRIGOLEIT CO., OF CHICAGO, ILLINOIS, A CORPORATION OF ILLINOIS.

PRESSURE-CONTROL SYSTEM.

Application filed September 14, 1923. Serial No. 662,791.

My invention relates to pressure feed systems, and has to do more particularly with systems in which substances under different pressures are fed to one or more hydraulic presses for forming moulded objects.

In moulding systems, presses are provided and moulds or dies of desired shapes are placed in the presses, and a moulding compound is then placed therein. The moulds or dies are then subjected to hydraulic pressure of various values to form the moulding compound into the desired shapes. In moulding systems, there are known in the art two kinds of moulding methods, hot moulding and cold moulding. In hot moulding a low pressure is applied to the press to close the halves of the mould, and then at a predetermined time, a higher pressure is applied to further press the moulding compound into the desired shape. Steam is also applied to heat the compound, as is also water for cooling the mould and compound. In cold moulding, the pressures are also applied as in hot moulding, but no steam or water is applied.

In systems of the above type, high and low pressure accumulators are provided, and pumps associated therewith for forcing the fluid into the accumulators and for maintaining them filled to supply the maximum demands of all the presses. Systems of this type necessitate means for automatically connecting and disconnecting the pumps from the accumulators as the pressure drops below or rises to the desired values and an object of my invention is to arrange a system of this kind and supply mechanism for this system so that one pump will supply fluid for both the high and low pressure accumulators at constant pressures.

A feature of my invention is the means provided by which the pumping pressures in both the high and low accumulators are maintained substantially constant, whether the accumulators are completely filled, or whether the accumulators are receiving fluid from the pump.

A further feature of my invention is the construction employed to maintain the accumulators at the desired pressures, while by-passing the fluid from one accumulator to the other, and from this other accumulator to the surge tank when the accumulators are filled.

A further feature of my invention is the provision of a double valve having different sized valve seats in association with a check valve for each valve also provided with different sized openings. I adjust the double valve mechanism so that the smaller valve opens first, and then the larger valve. The check valves associated with the double valve mechanism are so connected that when the accumulators are raised to their desired height, the check valves operate in conjunction with the double valve mechanism to permit the fluid from the pump to be by-passed to a surge tank. When the accumulators descend, the larger valve of the double valve mechanism closes, and at the same time its associated check valve closes, which is also provided with a large opening to permit fluid from the pump to pass to the accumulator. The small valve of the valve mechanism remains partially open, permitting a portion of the fluid to by-pass, and its associated check valve which is also provided with a small opening, remains closed. Thus the valve mechanism and its associated check valves operate automatically to maintain the back pressure on the pump substantially constant so that the pump at all times is operating at a constant pressure, thus obviating the sudden strains thrown upon the pump in prior systems.

A still further feature of my invention is the provision of a valve flange which eliminates the usual valve packing. In systems where pressures as high as three and four thousand pounds to the square inch are used the force of the liquid quickly deteriorates the packing of the valves and causes them to leak, thus necessitating the continuous replacing of packing. To overcome this, I have devised a valve flange in association with a ring of suitable soft metal which, when seated in position and placed under pressure, prevents any leakage of the valve and lasts indefinitely, obviating the continuous replacing of the packing.

The above features of my invention, as well as others, will be more fully pointed out and described in the ensuing specification and in the appended claims.

For a more complete understanding of my invention reference may be had to the accompanying drawings in which like reference characters in the different views denote like parts, and in which.

Figure 1:
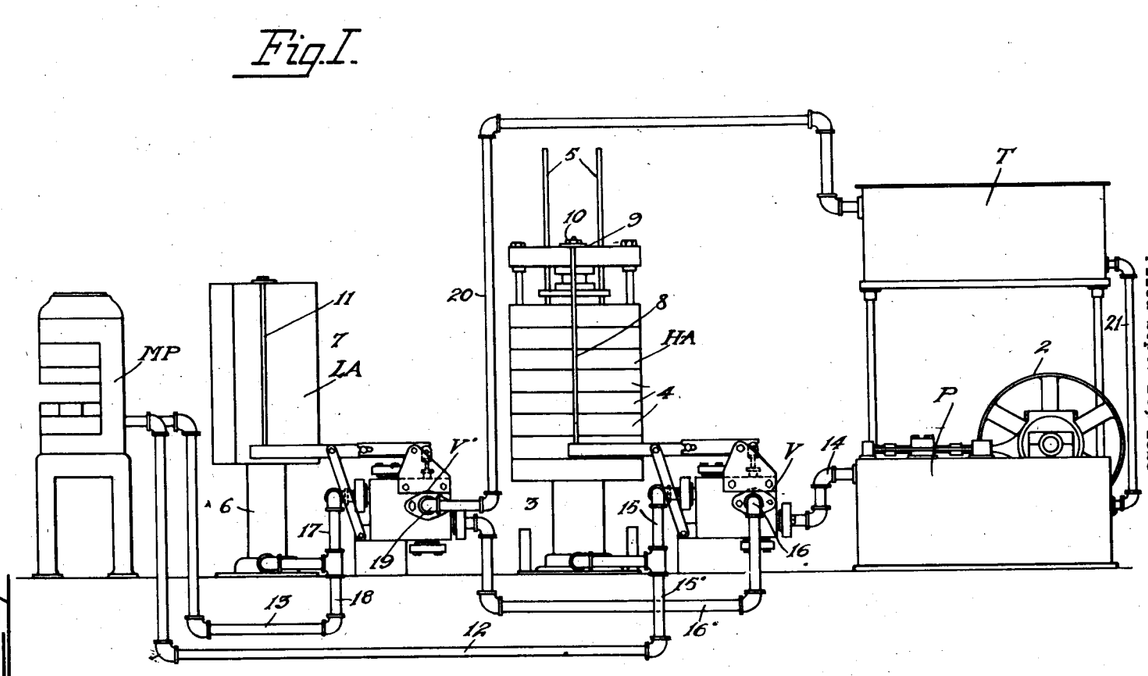
Fig. 1 diagrammatically represents my pressure feed system.

Referring first to Fig. 1, I illustrate diagrammatically the valves of my invention operating in connection with a pressure feed system, in which P represents the pressure pump which is connected to a driving motor, not shown, by means of a belt and its pulley wheel 2 to pump the fluid, such as water, from the supply tank T to the high pressure accumulator HA and low pressure accumulator LA.

I diagrammatically illustrate one of the moulding presses MP, and while I have only shown the high and low pressure feed pipes connected to this press, it is to be understood that the necessary steam, air, and other connections are connected to the moulding press, so that it may be operated properly.

Referring to the high pressure accumulator HA, this comprises a cylinder 3 into which the fluid is pumped against a suitable ram which supports the weights 4, and which weights 4 rise as the amount of fluid in the cylinder is increased. Guide rods 5 are provided for the accumulator HA to guide it in its upward and downward movement. The low pressure accumulator LA is substantially the same as the accumulator HA, and is provided with a cylinder 6 and a suitable ram against which the fluid is pumped to raise the weighted body 7 of the accumulator LA.

I illustrate one of the valve mechanisms of my invention at V in operative association with the accumulator HA, and which is fully illustrated in Figs. 2 to 5, inclusive. The valve mechanism V associated with the accumulator HA is controlled by a rod 8, which fits loosely through an orifice in a plate 9 secured to the top of the accumulator HA. A stop 10 attached to the rod 8 is provided so that when the accumulator HA reaches a predetermined height, the valve rod 8 is moved to operate the mechanism of the valve V associated with the accumulator HA. A valve V' and a control rod 11 associated with the accumulator LA is substantially the same as the valve V and its controd rod 8.

Pipe 12 is the high pressure supply lead, and pipe 13 is the low pressure supply lead, which pipes 12 and 13 lead to the different presses, only one of which is shown.

The outlet pipe 14 from the pump P is connected through the valve V to the accumulator HA by the pipe line 15, and the branch 15' from the accumulator HA is connected to the supply line 12. The by-pass outlet 16 of the valve V is connected by the pipe line 16' to the valve V' and to the accumulator LA through the valve V' by the pipe line 17, and a branch 18 from the accumulator LA is connected to the supply line 13. The by-pass outlet 19 of the valve V' is connected by means of the pipe line 20 to the supply or surge tank T, and the tank T in turn is connected to the pump P by the pipe 21.

Referring now more particularly to the valve mechanism of my invention as illustrated in Figs. 2 to 5, inclusive, the valve mechanism comprises a pair of valves 22 and 23 and a pair of check valves 24 and 25 and connected by suitable ducts as will now be described. The valve mechanism comprises a valve block 26 into which extends a duct 27 which intersects a longitudinal duct 28, which duct 28 connects the two valves 22 and 23 for purposes as will be more fully hereinafter described. The duct 28' which is a continuation of duct 28, is threaded to receive a plug 29. Located above and parallel with the orifice 28 is a duct 30 also connecting the two valves 22 and 23 and its continuation 30' beyond the valve 22 forms the by-pass opening 16 for the fluid when the valves 22 and 23 are open and is adapted to receive a pipe connection. As illustrated in Fig. 1 the by-pass opening 16 of the valve V associated with the accumulator HA leads to the valve V' associated with the accumulator LA and the by-pass opening of the valve V' which bears the reference character 19 is connected by a pipe connection 20 to the surge tank T for purposes as will be more fully hereinafter described. Extending at right angles to the ducts 28 and 30, and extending laterally from the valves 22 and 23 are ducts 31 and 32 and their ends 31' and 32' are threaded to receive plugs 33. Extending vertically into the block 26 from the ducts 31 and 32 are orifices 34 and 35 which connect the check valves 24 and 25 with the ducts 31 and 32, respectively. A longitudinal duct 36 connects the two check valves 24 and 25 and its continuation 36' is threaded to receive a plug 37. A laterally extending duct 38 intersects the longitudinal duct 36, which duct is adapted to receive pipe connections such as 15 and 17 for purposes as will be hereinafter described.

The valve structure 22 is provided with a central chamber 40 and fitting therein is a valve seat member 41 which is provided with an orifice 42 that has a slightly chamfered circumferential edge to form a seat for the valve ball 43. To hold the valve seat member 41 in position, a plug 44 is provided which fits into the central chamber 40 against the said valve seat member 41. The plug 44 is provided with an annular beveled face 45, and the enlarged portion 40' of the central chamber 40 is also provided with an annular beveled face 46. The plug 44 is provided with a reduced head portion 44', and the space between the inner circumferential face of the enlarged portion 40' of the central chamber 40 and the circumferential face of the reduced head portion 44' of the plug, when the plug is in position in the said chamber 40, forms an annular groove 48. The beveled faces 45 and 46 of the plug 44 and the enlarged portion 40' of the chamber 40, when in position, form a V shaped bottom 49 for the annular groove 48, for purposes as will now be described.

I provide an oval shaped valve flange 50 which has integrally formed therewith an annular ring 51 of a size to rest in the annular groove 48. A ring 52 of suitable soft metal, such as copper, having a V-shaped edge 53, rests in the V-shaped bottom 49 concentric with the groove 48. When the ring 52 is in this position, the valve flange 50 is placed in position with its annular ring extension 51 resting in the annular groove 48 with its ring face 55 resting against the flat edge 56 of the ring 52. Suitable bolts 57 are provided which pass through suitable openings in the valve flange 50 and have screw-threaded engagement with suitable tapped orifices in the valve blocks 26. When the flange is drawn up by the bolts 57, the annular ring extension 51 which rests on the ring 52, places the ring 52 under compression and forces its V-shaped edge 53 in to the V-shaped bottom 49 of the annular groove 48. This valve flange 50 when in position, as just described, holds the plug 44 in position and the ring 52 as it is forced into the V-shaped bottom 49 of the annular groove 48 forms a positive means to prevent leakage between the plug 44 and the block 26.

To connect the intake duct, 27, outlet duct 38 and by-pass duct 30' to the pipe line I provide pipe flanges 100 and as all are similar in construction the description of one will be sufficient. The pipe flange 100 is oval in shape and is provided with a central tapped orifice 101 and an integrally formed ring member 102. An annular groove 103 formed in the block 26 is of a size to form a sliding fit between the ring member 102 of the flange 100 and the said annular groove 103. Bolts 104 are provided which pass through suitable orifices in the flange 100 and have screw threaded engagement with tapped orifices in the block 26 to clamp the flange in position. A pipe connection has threaded engagement with tapped orifice 101 and connects the pipe line to the valve.

Extending vertically into the block 26 through a suitable orifice 60 is a valve control rod 61 provided with a reduced end portion 62 which extends into the central orifice 42 of the valve seat member 41 to engage the valve ball 43. A packing nut 63 is provided which has screw-threaded engagement with a suitable tapped orifice 64 in the valve block 26 to hold the packing 65 in place to prevent leakage between the rod 61 and the block 26. The rod 61 contacts with the valve ball 43, and depresses the same when the valve is opened to permit the flow of fluid from the duct 28 through the duct 30 into the by-pass duct 30. The plug 44 is provided with several radially extending orifices 66 that open into the chamber 31.

The construction of the larger valve mechanism 23 is substantially the same as the construction of the smaller valve mechanism 22 just described.

The check valve 24 is provided with a central chamber 68 and fitting therein is a valve seat member 69 which is provided with a central orifice 70 that has a slightly chamfered circumferential edge to form a seat for the valve ball 71. To hold the valve seat member 69 in position, a plug 72 is provided which fits in the central chamber 68 against the valve seat member 69, and the plug 72 is held in position by means of a valve flange 73 similar in construction to the valve flange 50, and a further description is not thought necessary. The plug 72 is provided with a plurality of radially extending orifices 74 that open into the chamber 68.

Figure 4:
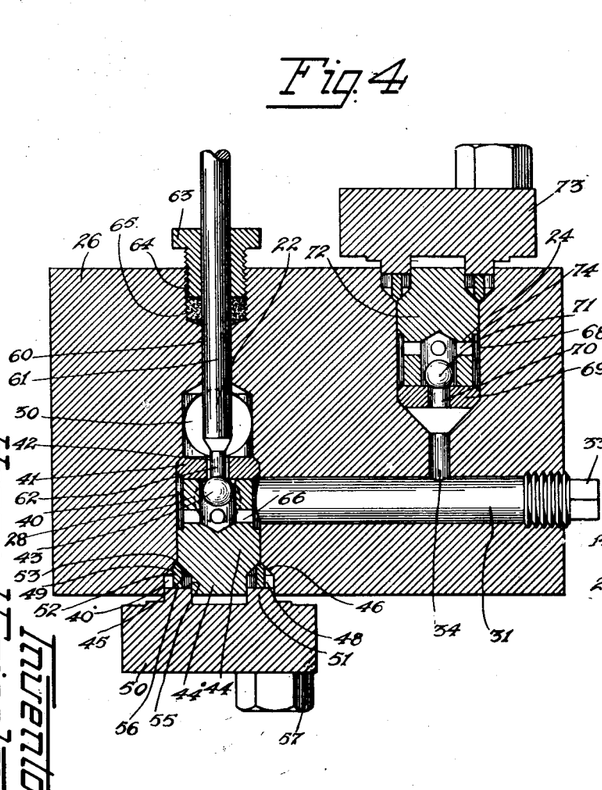
Fig. 4 is a sectional view along the line 4—4 of Fig. 3.
Figure 5:
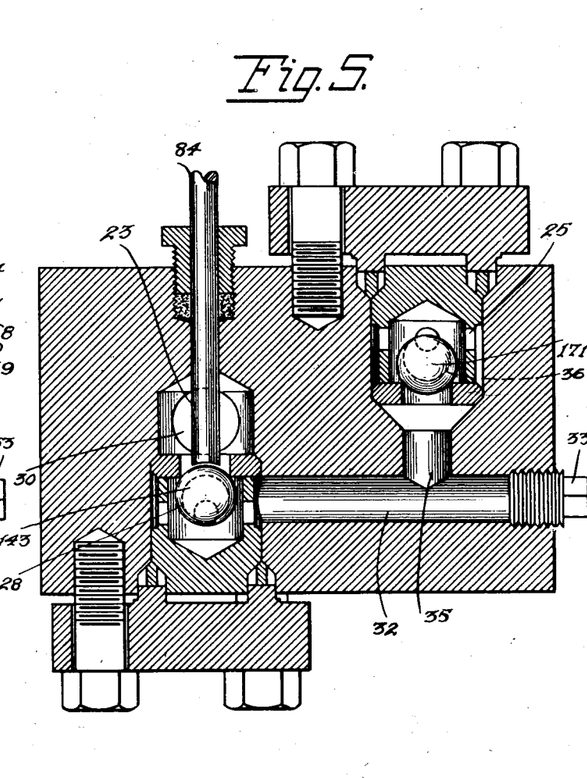
Fig. 5 is a sectional view along the line 5—5 of Fig. 3.

By referring to Figs. 4 and 5, it will be noted that the smaller valve 22 as illustrated in Fig. 4 is adjusted to be opened before the larger valve 23 is opened. The smaller valve 22 of the valve V is adjusted so that it is always partially opened to permit a flow from the pump P to the accumulator LA even though the main flow from the pump is into the accumulator HA.

Attached to the side of the block 26 by means of bolts 79 are a pair of brackets 78 which support a pivot shaft 75 and pivotally secured to the pivot shaft 75 at 80 are a pair of arms 81 and 81' and pivotally secured to each arm 81 and 81' at 82 are U-shaped dependent members 83 and 83', one member 83 being connected to the valve rod 61 of the valve 22, and the other member 83' being connected to the valve control rod 84 of the valve 23. The valve rods 61 and 84 are provided with threaded ends and the members 83 and 83′ are provided with threaded orifices which are adapted to receive the threaded ends of the valve rods 61 and 84. These valve rods 61 and 84 are adjustable vertically by means of the threaded connection with the members 83 and 83′. This adjustment is provided so that the valve rods 61 and 84 may be adjusted with reference to their associated valve balls 43 and 143, and when thus adjusted lock nuts 85 having threaded engagement with the ends of the rods 61 and 84 lock the valve rods 61 and 84 in their adjusted positions. Pivotally secured to the pivot shaft 75 at 86 is a rearwardly extending arm 87 which is connected as illustrated in Fig. 1 to the rod 8 associated with the accumulator HA and through the medium of this rod 8 and its connection with the arm 87; the movement of the accumulator HA in its up and down travel controls the opening and closing of the valves 22 and 23 as will presently be described. Pivotally secured to the arm 87 at 88 is a pair of rearwardly extending arms 89 and 89′ which support intermediate of their ends pin members 140 and 140′ which are suitably secured to the respective arms 89 and 89′ and which pins 140 and 140′ project into slots 141 and 141′ in the free ends of the respective arms 81 and 81′. A pair of arms 90 and 90′ are provided which are pivotally secured to the arms 89 and 89′ at their ends at 91 and at their other ends the arms 90 and 90′ are pivoted by means of pivot pins 93 secured to a block 92 which is secured to the valve block 26 by means of bolts 76.

Figure 2:
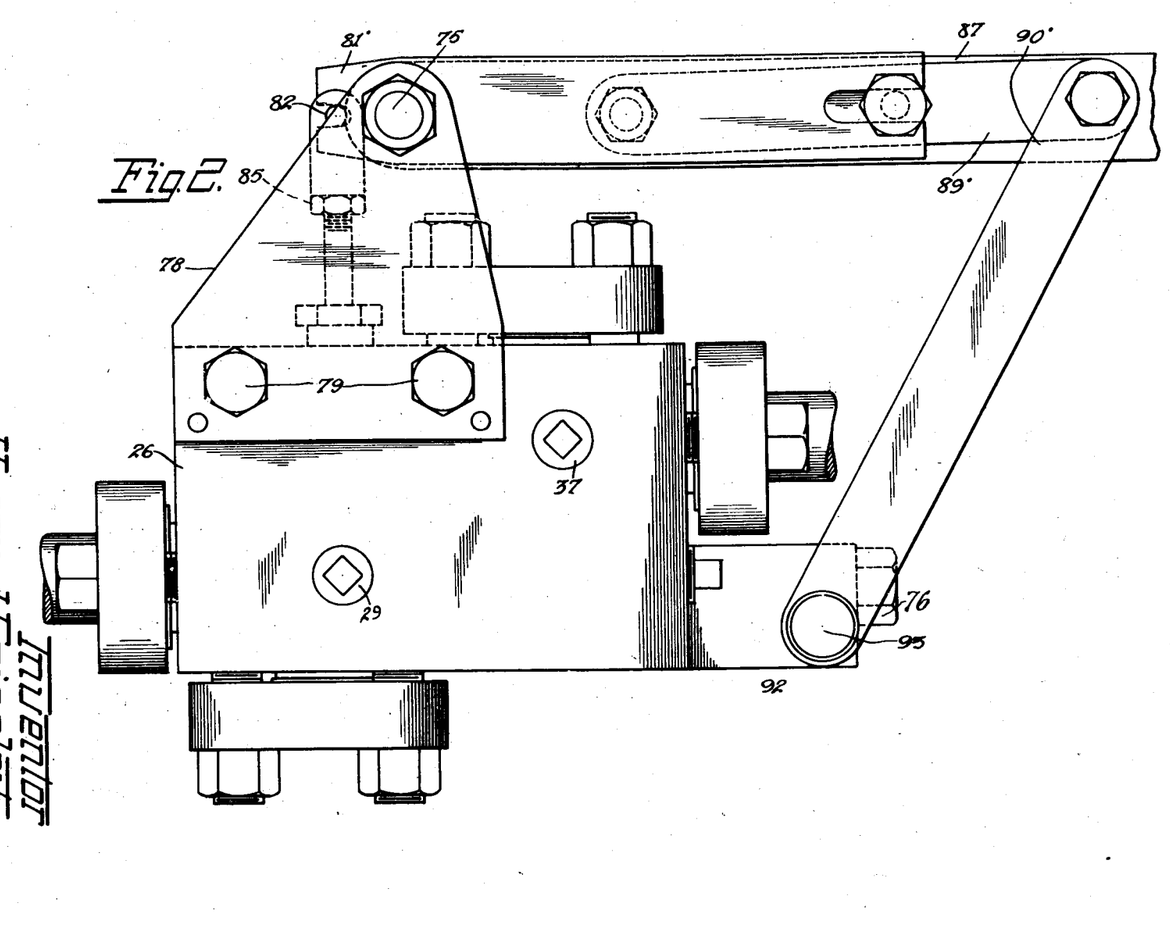
Fig. 2 is a side elevation showing one of my valves and its control parts.
Figure 3:
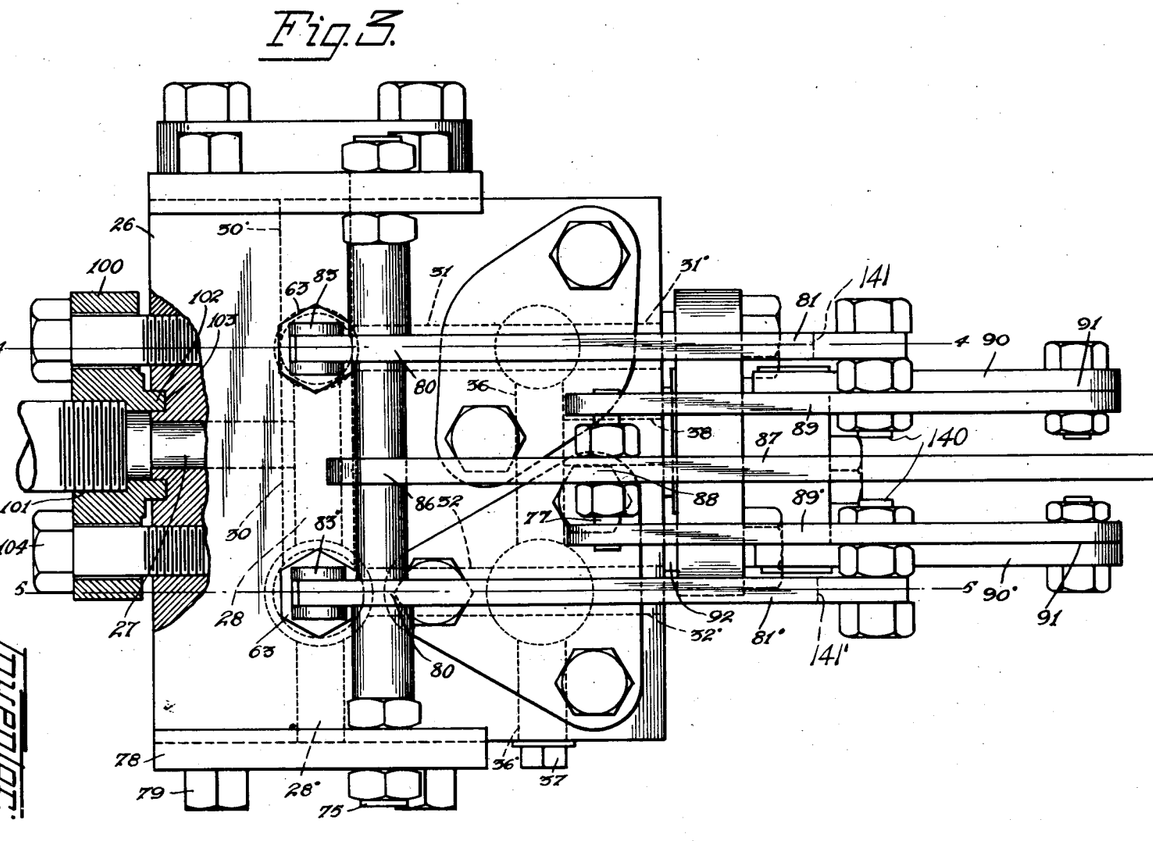
Fig. 3 is a plan view of Fig. 2.

The arm 87 as illustrated in Fig. 1 is connected to the accumulator HA by means of the rod 8 and when the accumulator HA ascends the right end of the arm is raised with reference to Fig. 2, the said arm 87 during its movement rotating about its pivoted connection 86 on the shaft 75. This upward movement of the arm 87 causes the left end of the arms 89 and 89′ to be raised due to the pivoted connection 88 of the arms 89 and 89′ with the arm 87, the said arms 89 and 89′ during their movement rotating about their pivoted connections 91 on the arms 90 and 90′. The pins 140 and 140′ which are secured to an intermediate portion of the arms 89 and 89′ extend into slots 141 and 141′ in the free ends of the respective arms 81 and 81′ and this upward movement of the arms 89 and 89′ in turn raises the right end of the arms 81 and 81′ due to pin and slot connections of pins 140 and 140′ of the arms 89 and 89′ with the slots 141 and 141′ in the arms 81 and 81′. This upward movement of the right end of the arms 81 and 81′ causes them to rotate about their pivot points 80 on the shaft 75 and causes the left end of the arms 81 and 81′ to move down. As before described the U-shaped members 83 and 83′ are pivotally supported on the left end of the arms 81 and 81′ and due to their connection with the valve rods 61 and 84 this downward movement of the left end of the arms 81 and 81′ causes the valve rods 61 and 84 to be forced down to depress the valve balls 43 and 143 of the valves 22 and 23, the valve ball 43 of the valve 22 first for purposes as will presently be described. When the accumulator HA descends the right hand end of the arm 87 is lowered causing the arms 89 and 89′ to be lowered, which movement in turn lowers the right end of the arms 81 and 81′ due to the pin and slot connections as already described. This downward movement of the right end of the arms 81 and 81′ causes the left end of the arms 81 and 81′ to raise and due to the connecting links 83 and 83′ between the left end of the arms 81 and 81′ and the valve rods 61 and 84, these rods 81′ are raised, thereby permitting the valve balls 43 and 143 of the valves 22 and 23 to seat in their valve seats the valve ball 143 seating first for purposes as will presently be described. The combination of arms in pivoted relation with each other permits a wide range of movement of the arm 87 in its up and down movement when connected with the accumulator HA in relation to the small movement of the left end of the arms 81 and 81′ in an up and down direction to manipulate the valve rods 61 and 84 to bring about the opening and closing of the valves 22 and 23.

Referring now particularly to Fig. 1 of the drawings, when the pump P is started in operation, it pumps fluid through the pipe line 14, through the valves 22 and 23, through the ducts 31, 32, and orifices 34 and 35 and check valves 24 and 25, through duct 38 and into the cylinder 3 of the accumulator HA which causes the accumulator HA to ascend until the valve rod 8 which is attached to the arm 9, is raised a sufficient amount to open the valve balls 43 and 143 of the valves 22 and 23. As previously mentioned, the high pressure feed line 12 is directly connected by a branch 15, through the valves 22 and 23 from the pump P to the presses MP. The valve 22 being partially opened even though the accumulator is not in its upper position due to its adjustment as previously described, part of the fluid pumped by the pump P passes through the by-pass opening 16 and through the pipe line 16′ through the valves of the valve block V′ associated with the accumulator LA to low pressure accumulator LA, and by the branch line 18 to the low pressure feed line 13 to supply liquid to the accumulator LA and line 13. Now, as the accumulator HA reaches the uppermost position, the valves 22 and 23 of the valve block V are opened allowing the fluid that is being pumped by the pump P to pass entirely through the by-pass opening 16 through the pipe line 16' to the valves of the valve block V and there through to the accumulator LA through line 17 and to the low pressure line 13 by the line 18. The back pressure from the accumulator HA forces the valve balls 71 and 171 of the check valves against their seats 69 and 169 so that the only flow from the accumulator HA now passes through the line 15' and high pressure line 12 to the presses MP. Now, as the fluid is being pumped into the cylinder 6 of the accumulator LA, it is raised to a position where it opens the valves of the valve block V' associated therewith through the medium of the rod 11 to permit the by-passing of the fluid being pumped through the by-pass opening 19 of the valve V' into the surge tank T through the pipe line 20. Now when the accumulator LA reaches its uppermost position, the back pressure from the accumulator LA through the line 17 forces the valve balls of the check valves of the valve V' against their seats so that the only flow from the accumulator LA is now through the line 18 to the low pressure feed line 13.

From the above, it is obvious that the instant that the high pressure from the accumulator HA is used it starts descending, and as before pointed out, the valve 22 which is provided with a small opening, and the valve 23 with a large opening, are so adjusted in relation to each other, that when the valves are operated as the accumulator HA rises, the valve 22 opens first, followed by the valve 23, and when the accumulator descends, the valve 23 is the first to close, but the valve 22 still remains open as before described and the pump P overcomes the back pressure from the accumulator HA on the valve ball 171 of the check valve 25, due to the fact that the instant the accumulator HA descends the rods 61 and 84 ascend and due to their adjustment the valve ball 143 closes first and the fluid from the pump P now passes through the duct 32 and orifice 35, the check valve 25 and the duct 38 to the pipe line 15 leading to the accumulator HA and line 12. The check valve 24 remains closed as the back pressure from the accumulator HA is great enough due to the fact that the valve 22 is still partially open and fluid from the pump P is still passing through the by-pass opening 16 which leads to the valve V' associated with the accumulator LA. This action of the valves 22 and 23 and check valves 24 and 25 permits the pump to gradually pick up its load and prevents a sudden load being placed on the pump when the accumulator descends. As the accumulator further descends the valve 22 will be further closed until the fluid from the pump passing through the duct 31 and orifice 34 overcomes the back pressure on the check valve ball 71 permitting the pump to feed the descending accumulator with its full capacity.

The valve V' comprising its valves and check valves associated with the accumulator LA operate in a manner similar to the valve V of the accumulator HA, and from the foregoing, it is obvious that the pressure between the pump P and valve V is maintained at a predetermined high pressure point, and the pressure between the valves V and V' is maintained at a predetermined low pressure. The check valves 24 and 25 of the valve V prevent a surge back from the pipe line 12 into the pipe line 14, and the check valves in the valve V' prevent a surge back from the pipe line 13 into the pipe 16'. The check valves 24 and 25 of the valve V prevent the sudden dropping of the accumulator HA if a great number of presses are using the pipe line 12 at the same time. At the instant the accumulator starts descending, the check valves are opened as before described and the pump again supplies the accumulator HA at its full capacity, while the check valves of the valve V' prevent the dropping of the accumulator LA if a great number of presses are using the pipe line at the same time.

From the previous description, it is also obvious that as liquid is taken from the pipe line 12, the pump P and valve V will maintain the pressure in the pipe line 12 at substantially the predetermined value. The pump P will also, in conjunction with the accumulator LA and valve V', maintain the pressure in the pipe line 13 at substantially the predetermined value. These valves will operate to automatically prevent the accumulators from dropping to their lowermost positions, when the presses are in use, and will by-pass the liquid from the pump P to the surge tank T if the normal use of the liquid through the pipe lines 12 and 13 is less than the output of the pump P.

My system is entirely automatic and no matter how many presses may be suddenly turned on or off, the valves will cause the accumulators to substantially maintain the pressures at the desired values. A sudden usage of a number of presses will cause the accumulators to drop a slight amount, still the pressures will be maintained at the desired values, and the pump will again restore the accumulators to their upper positions before the pressures drop below the desired predetermined amounts.

While I have illustrated only one form of my invention, I do not wish to be limited to the exact arrangement as shown, as various other arrangements may readily suggest themselves to those skilled in the art, and I, therefore, aim to cover all such changes Having described my invention what I claim as new and desire to secure by Letters Patent is:

1. In a pressure feed system of the character described including a high pressure accumulator and a low pressure accumulator, and a single pump for supplying fluid to said accumulators, valve mechanism for said accumulators for maintaining the pressures in said accumulators at a predetermined point, double valve mechanism for each valve, and check valves for each valve of said double valve mechanism for automatically controlling the pressure of said accumulators.

2. In a pressure feed system of the character described including a high pressure accumulator and a low pressure accumulator and a single pump for suppling fluid to said accumulators, valve mechanism for each of said accumulators for maintaining the pressures of said accumulators at a predetermined point, double valve mechanism for each valve, and check valves for each of said double valve mechanisms for automatically controlling the pressure of said accumulators, said check valves preventing a back flow from said accumulators when raised to desired values.

3. In a pressure feed system of the character described including a high pressure accumulator and a valve mechanism therefor, a low pressure accumulator and a valve mechanism therefor, a pump for supplying fluid under pressure to said accumulators, said valve mechanism of said accumulators maintaining the pressures of said accumulators at predetermined points, feed lines for said accumulators, double valve mechanism for each of said valves for controlling the pressure of said accumulator, check valves for each valve of said double valve mechanism to permit the flow from said accumulators to said feed lines and preventing a back flow to said pump from said accumulators.

4. In a pressure feed system of the character described including an accumulator, a pump for supplying fluid under pressure to said accumulator, valve mechanism for said accumulator for maintaining the pressure of said accumulator at a predetermined point and by-passing the excess flow not used by said accumulator, double valves for said valve mechanism, and a check valve for each valve of said double valve mechanism to permit the flow from said accumulator and prevent a back flow to said pump.

5. In a valve device of the character described comprising a valve body, a valve in said valve body, a valve seat for said valve, a plug for said valve for holding said valve seat in position, a valve flange for holding said plug in position, and means including a ring member forming packing to prevent leakage between said valve body and said plug.

6. In a valve device of the character described comprising a valve body, a valve seat, a chamber in said valve body for said valve seat, a plug resting in said chamber to hold said valve seat in position, a flange for holding said plug in position, and means including a ring member engaging said plug to form packing to prevent leakage between said valve body and said plug.

7. In a valve device of the character described comprising a valve body, a valve seat, a chamber in said valve body for said valve seat, a valve plug resting in said chamber to hold said valve seat in position, a beveled face in said chamber, a beveled face on said plug, a ring member engaging said beveled faces, a flange for holding said plug in position, and means for securing said flange to said body and maintaining said ring in position to prevent leakage between said body and plug.

8. A valve device including a valve block provided with a chamber, a valve seat adapted to fit into said chamber, a member for securing said valve seat in position, a packing ring of relatively soft material adapted to contact with said member, and a flange secured to said valve body for holding said packing ring and said member in position.

9. A valve mechanism including a valve block having a valve chamber, a valve seat adapted to fit into said valve chamber and a plug for holding said valve seat in position, a valve ring of relatively soft metal for preventing leakage out of said valve chamber, and a flange secured to said valve block for holding said plug and said valve ring in position.

10. A valve device including a valve block provided with a chamber, a valve seat adapted to fit into said chamber, and a metal packing ring contacting said valve block for preventing leakage from said valve block.

11. A valve device of the character described including a valve housing adapted to receive a valve and valve seat, and a metallic packing ring contacting said valve housing for preventing leakage from said valve housing.

12. A valve device of the character described including a housing provided with a chamber, a valve seat adapted to fit into said chamber, a retaining member fitting said chamber and abutting against said valve seat, and an angularly shaped metallic packing ring contacting with the valve block and said retaining member for preventing leakage out of said orifice.

13. A valve device of the character described including a valve block having a chamber, a valve seat adapted to fit into said chamber, a retaining member fitting said chamber for retaining said valve seat in position, said retaining member and block being provided with an angularly shaped adjacent shoulder forming an annular groove, a metallic ring adapted to fit into said groove, and means for retaining said metallic ring in position.

14. A valve of the character described including a valve housing provided with a chamber having an angular shoulder, said chamber adapted to receive a valve seat, a retaining member fitting in said chamber for holding said valve seat in position and provided with an angular shoulder, a packing ring adapted to fit into the groove formed by such shoulders, and a member adapted to exert pressure against said packing ring to form a tight connection between the valve chamber and retaining member.

15. A valve device having a housing provided with an annular chamber, a valve seat adapted to fit into said annular chamber in said housing, a retaining member fitting in said chamber for holding said valve seat in position, a metallic packing ring, a pressure flange adapted to abut against said packing ring to prevent leakage between said retaining member and valve housing.

16. A valve device of the character described including a valve block, a valve member and a check valve associated with said valve member and located in said block, an inlet port, an outlet port, and a by-pass port, said valve member controlling the passage from said inlet port to said by-pass port, and said check valve controlling the passage from said outlet port to said by-pass port.

17. A valve mechanism including a valve block provided with a check valve and with a mechanically controlled valve, said check valve being associated with said mechanically controlled valve, an inlet port, an outlet port and a by-pass port, said mechanically controlled valve controlling the passage from said inlet port to said by-pass port and said check valve controlling the passage from said outlet port to said by-pass port.

18. A valve mechanism of the character described including a valve block, a pair of mechanically controlled valves in said valve block, a pair of check valves in said valve block, an inlet port, an outlet port, and a by-pass port in said valve block, said mechanically controlled valves controlling openings between said inlet port and said by-pass port and said check valves controlling openings between said inlet and outlet ports.

19. A valve device of the character described including a valve block, a mechanically controlled valve and a check valve in said block, a duct connecting said valves, means including a valve rod and a valve ball of said first valve for controlling the operation of said check valve, and a packing ring of relatively soft material for said first valve.

20. A valve device of the character described including a valve block, a mechanically controlled valve and a check valve in said block, a duct connecting said valves, an inlet port, an outlet port controlled by said check valve, and a by-pass port controlled by said mechanically controlled valve, and a packing ring of relatively soft material for preventing leakage of said valves.

21. A device of the character described including a valve block provided with a mechanically controlled valve and a check valve, a by-pass port, an outlet port, a duct connecting said valves, said valves controlling the openings of said by-pass and outlet ports, and flanges secured to said valve block for holding packing rings in position to prevent leakage of said valves.

22. A valve device of the character described including a valve block provided with a mechanically controlled valve and a check valve, an inlet port and a pair of outlet ports extending into said valve block, said inlet port and one of said outlet ports being associated with said first valve and the other outlet port being associated with said check valve, packing rings for each of said valves, and flanges secured to said valve block for maintaining said rings in position to prevent leakage of said valves.

23. A valve device of the character described including a valve block, a pair of mechanically controlled valves and a pair of check valves associated with said mechanically controlled valves included in said block, and ports extending into and out of said block, said valves controlling said ports.

24. A valve device of the character described including a valve block, a pair of mechanically controlled valves and a pair of check valves associated with said first valves and included in said block, ports extending into and out of said block, interconnecting ducts between said valves, said valves controlling said interconnecting ducts.

Signed by me at Chicago, Illinois, this 11th day of September, 1923.

HENRY J. GRIGOLEIT.